United States Patent
Deviprasad et al.

(10) Patent No.: US 11,838,221 B2
(45) Date of Patent: Dec. 5, 2023

(54) SYSTEMS AND METHODS FOR MULTI-CLOUD VIRTUALIZED INSTANCE DEPLOYMENT AND EXECUTION

(71) Applicant: Verizon Patent and Licensing Inc., Basking Ridge, NJ (US)

(72) Inventors: Prasad Deviprasad, Cary, NC (US); Hans Raj Nahata, New Providence, NJ (US); Fernando Oliveira, Bristol, NH (US); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 17/574,730

(22) Filed: Jan. 13, 2022

(65) Prior Publication Data
US 2023/0224257 A1      Jul. 13, 2023

(51) Int. Cl.
| | |
|---|---|
| H04L 47/78 | (2022.01) |
| H04L 47/70 | (2022.01) |
| H04L 15/16 | (2006.01) |
| G06F 9/455 | (2018.01) |
| G06F 15/16 | (2006.01) |
| H04L 29/12 | (2006.01) |
| H04L 29/06 | (2006.01) |
| H04L 29/08 | (2006.01) |
| H04L 67/10 | (2022.01) |

(52) U.S. Cl.
CPC ........ *H04L 47/781* (2013.01); *G06F 9/45558* (2013.01); *H04L 47/788* (2013.01); *H04L 47/828* (2013.01); *G06F 2009/45595* (2013.01)

(58) Field of Classification Search
CPC ... H04L 47/781; H04L 47/788; H04L 47/828; G06F 9/45558; G06F 2009/45595
USPC ......................................................... 709/226
See application file for complete search history.

(56) References Cited

U.S. PATENT DOCUMENTS

| | | | | |
|---|---|---|---|---|
| 5,103,421 A | * | 4/1992 | Ward | G06F 30/00 |
| 8,429,276 B1 | * | 4/2013 | Kumar | G06F 9/5077 |
| | | | | 718/1 |

(Continued)

FOREIGN PATENT DOCUMENTS

| | | | | |
|---|---|---|---|---|
| CN | 111953725 A | * | 11/2020 | ............ G06F 11/30 |
| EP | 3443500 B1 | * | 4/2022 | ............ G06F 21/44 |
| WO | WO-2016079721 A1 | * | 5/2016 | ......... H04L 41/0843 |

*Primary Examiner* — David R Lazaro
*Assistant Examiner* — Berhanu Shitayewoldetadik

(57) ABSTRACT

A system may receive a first definition for a virtualized instance of a network function. The first definition may include a first set of declarations in a first format that is different than respective formats supported by different virtualized environments. The system may select a first virtualized environment to run the virtualized instance based on requirements specified within the first definition, and may generate a second definition with a second set of declarations that map the first set of declarations from the first format to a second format supported by the first virtualized environment. The system may deploy the virtualized instance to the first virtualized environment using the second set of declarations from the second definition. Deploying the virtualized instance may include configuring its operation based on some of the second set of declarations matching a configuration format supported by the first virtualized environment.

20 Claims, 9 Drawing Sheets

(56) References Cited

U.S. PATENT DOCUMENTS

| | | | | |
|---|---|---|---|---|
| 8,806,479 B2* | 8/2014 | Alpern | | G06F 9/45558 |
| | | | | 718/1 |
| 9,733,918 B2* | 8/2017 | Alger | | G06F 8/61 |
| 11,086,685 B1* | 8/2021 | Koppes | | G06F 9/45558 |
| 11,490,273 B2* | 11/2022 | Jagannath | | H04W 24/02 |
| 11,510,208 B2* | 11/2022 | Lekutai | | H04W 76/15 |
| 2003/0051021 A1* | 3/2003 | Hirschfeld | | H04L 67/1027 |
| | | | | 709/223 |
| 2006/0111880 A1* | 5/2006 | Brown | | G06F 8/20 |
| | | | | 703/1 |
| 2006/0114928 A1* | 6/2006 | Utsunomiya | | H04W 74/0875 |
| | | | | 370/448 |
| 2006/0157640 A1* | 7/2006 | Perlman | | H04N 25/60 |
| | | | | 348/E5.079 |
| 2009/0172662 A1* | 7/2009 | Liu | | G06F 9/44505 |
| | | | | 718/1 |
| 2013/0007216 A1* | 1/2013 | Fries | | H04L 67/34 |
| | | | | 709/218 |
| 2013/0038766 A1* | 2/2013 | Perlman | | H04N 25/134 |
| | | | | 257/E31.127 |
| 2013/0173768 A1* | 7/2013 | Kundu | | G06F 40/137 |
| | | | | 709/223 |
| 2014/0007086 A1* | 1/2014 | Ross | | H04L 67/565 |
| | | | | 718/1 |
| 2014/0281909 A1* | 9/2014 | Pinto | | G06F 9/45529 |
| | | | | 707/810 |
| 2015/0019741 A1* | 1/2015 | DeCusatis | | G06F 9/45558 |
| | | | | 709/226 |
| 2015/0244716 A1* | 8/2015 | Potlapally | | H04L 63/0853 |
| | | | | 713/155 |
| 2015/0261514 A1* | 9/2015 | Fu | | G06F 8/63 |
| | | | | 718/1 |
| 2015/0268881 A1* | 9/2015 | Nielsen | | G06F 9/54 |
| | | | | 711/114 |
| 2015/0363453 A1* | 12/2015 | Carbajales | | G06F 16/2329 |
| | | | | 707/695 |
| 2016/0034260 A1* | 2/2016 | Ristock | | G06F 8/36 |
| | | | | 717/109 |
| 2016/0034302 A1* | 2/2016 | Fries | | H04L 67/34 |
| | | | | 718/1 |
| 2016/0234224 A1* | 8/2016 | Ashley | | H04L 63/20 |
| 2016/0253160 A1* | 9/2016 | Alger | | H04L 67/34 |
| | | | | 717/177 |
| 2016/0335114 A1* | 11/2016 | Fu | | G06F 9/45558 |
| 2018/0041515 A1* | 2/2018 | Gupta | | H04L 63/0815 |
| 2018/0109421 A1* | 4/2018 | Laribi | | H04L 43/0817 |
| 2018/0123899 A1* | 5/2018 | Dorr | | H04L 41/145 |
| 2018/0123900 A1* | 5/2018 | Dorr | | H04L 41/145 |
| 2019/0028402 A1* | 1/2019 | Finn | | H04L 45/302 |
| 2021/0240818 A1* | 8/2021 | Seksenov | | G06F 16/986 |
| 2022/0253647 A1* | 8/2022 | Perkins | | G06N 20/20 |
| 2022/0255803 A1* | 8/2022 | Li | | H04L 41/0895 |

* cited by examiner

SYSTEMS AND METHODS FOR MULTI-CLOUD VIRTUALIZED INSTANCE DEPLOYMENT AND EXECUTION

BACKGROUND

A public "cloud" may provide different virtualized environments for running virtualized instances of network functions ("NFs"), applications, and/or services on shared resources that are managed by different cloud providers. Each cloud provider may require that the virtualized instances be modified to use and/or adhere to formatting, artifacts, application programming interface ("API") calls, and/or other operations that are specific to that cloud provider. Accordingly, the same virtualized instance that is deployed to one virtualized environment may be not deployed to other virtualized environments without modification.

DETAILED DESCRIPTION OF EXAMPLE EMBODIMENTS

Figure 1:
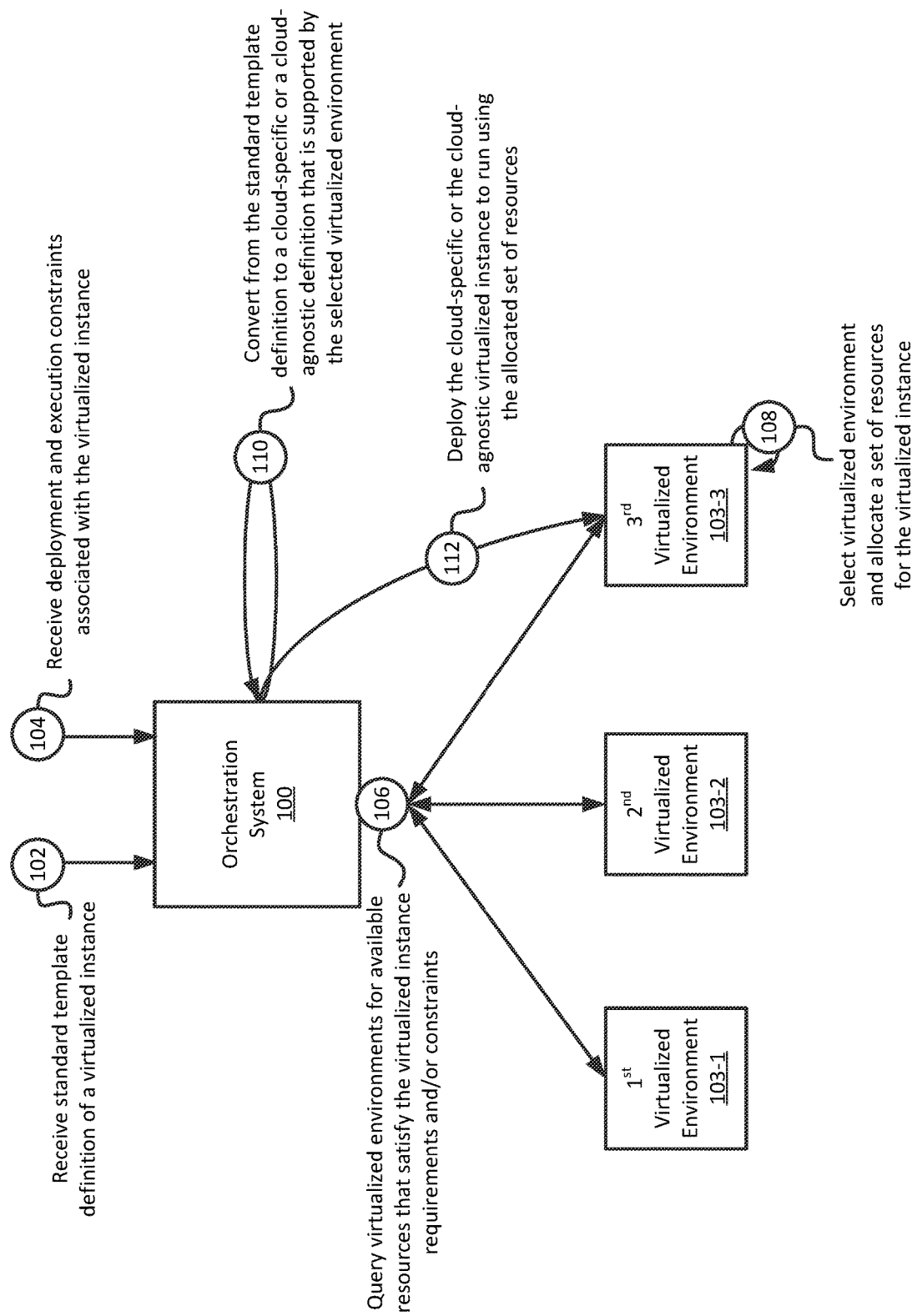
FIG. 1 illustrates an example overview of some embodiments presented herein.

The following detailed description refers to the accompanying drawings. The same reference numbers in different drawings may identify the same or similar elements.

Embodiments described herein provide an orchestration system and associated methods for dynamically generating a virtualized instance of a network function ("NF"), service, and/or application that uses and/or adheres to different formatting, artifacts, application programming interface ("API") calls, and/or other operations of different virtualized environments selected to run the virtualized instance. For example, different virtualized environments may be offered by different entities, such as cloud providers, with varying formatting, artifacts, etc. Accordingly, the orchestration system of some embodiments may adapt a single definition of the virtualized instance to run on any virtualized environment (e.g., a virtualized environment that the orchestration system determines to best satisfy the requirements and/or constraints of the virtualized instance), even if that single definition is incompatible with parameters, requirements, etc. associated with the virtualized environment (e.g., where such parameters, requirements, etc. may have been specified by one or more cloud providers associated with the virtualized environment). For instance, the single definition may contain declarations for the artifacts that implement services and/or functions of the virtualized instance, declarations for configuring the virtualized environment resources used to execute the artifacts, declarations for configuring the virtualized instance operation, and/or other declarations in a first format that differ from cloud-specific and/or cloud-agnostic formats supported by different virtualized environments for the deployment, configuration, and/or execution of virtualized instances on shared resources of those different virtualized environments. In other words, each virtualized environment may require different declarations with different arguments, variables, calls, artifacts, operations, structures, and/or other parameters to deploy, configure, and/or run the same virtualized instance.

In some embodiments, dynamically generating the virtualized instance may include converting from a standard template definition of the virtualized instance to a cloud-specific definition (e.g., a cloud-native definition) and/or to a cloud-agnostic definition that is supported by the one or more virtualized environments selected to run the virtualized instance. The standard template may provide declarations that may be used to define the topology, interfaces, relationships, connectivity, configuration, runtime operation, and/or other parameters of a virtualized instance in a single format. The orchestration system may automatically select one or more virtualized environments to run the virtualized instance, and may deploy, configure, and/or control runtime operation of the virtualized instance on the selected virtualized environments according to the different declarations supported by each virtualized environment for establishing the topology, interfaces, relationships, connectivity, configuration, runtime operation, and/or other parameters of the virtualized instance. For instance, the orchestration system may map the topology, interfaces, relationships, connectivity, configuration, runtime operation, and/or other parameters defined for the virtualized instance in the standard template definition to a format or template that is directly or indirectly supported by each selected virtualized environment. In some embodiments, the orchestration system may dynamically generate a virtualized instance that is compatible with each selected virtualized environment by constructing the virtualized instance using artifacts (e.g., scripts, binaries, configuration files, images, containers, virtual machines, and/or other applications or executable instructions) that are supported by the selected virtualized environment, deploying the virtualized instance using calls issued from the API of the selected virtualized environment or an integrated API, and/or managing the virtualized instance via other operations that directly or indirectly map to operations of the selected virtualized environment.

FIG. 1 illustrates an example of the dynamic runtime conversion for deploying and running the standard template definition of a virtualized instance across different virtualized environments in accordance with some embodiments presented herein. Detailed examples of such conversion are described below with respect to subsequent figures. As shown in FIG. 1, orchestration system 100 may receive (at 102) a standard template definition for a particular virtual network function ("VNF") that is to be deployed to, instantiated on, executed by, etc. one or more of virtualized environments 103-1, 103-2, and/or 103-3 (hereinafter sometimes collectively referred to as "virtualized environments 103" or individually referred to as "virtualized environment 103"). The particular VNF may implement various services and/or applications that are accessed, performed, etc. from a data network.

The standard template definition may include declarations for describing the particular VNF topology, infrastructure, required resources, network connectivity, and/or other services and functions. The standard template definition may further include declarations for configuring and/or defining the relationships between the services and functions as well as the operational behavior of the services and functions. These and other declarations within the standard template definition may be in a particular format that is not bound to any specific infrastructure or virtualized environment 103. For example, the standard template definition may include declarations with keywords, arguments, variables, calls, operations, a structure, and/or other parameters that may differ from keywords, arguments, variables, calls, operations, a structure, and/or other parameters of the different cloud-specific formats and/or cloud-agnostic formats supported by virtualized environments 103. Accordingly, orchestrators within each virtualized environment 103 may be unable to deploy, configure, and/or run the virtualized instance based on the unsupported declarations of the standard template definition, as the declarations of the standard template definition may be different from a supported or expected set of declarations based on which the virtualized environment 103 is configured to operate.

In some embodiments, the standard template definition may include node templates that model the components of the network services and/or network functions. In some embodiments, the standard template definition may include relationship templates that model the relations between the components. In some embodiments, the standard template definition may include and/or may be represented by a graph or other suitable representation.

In some embodiments, the standard template definition may correspond to a Topology and Orchestration Specification for Cloud Applications ("TOSCA") Cloud Service Archive ("CSAR") file. TOSCA may include a reference specification for describing the full topology and operational behavior of a virtualized instance running in the cloud. The topology may be defined as a set of connected nodes, which may represent components such as applications, virtual machines, storage volumes, networks, etc. that make up the virtualized instance. The operational behavior may be managed by defined relationships between the above components and through lifecycle management interfaces in the form of scripts, configurations, or API invocations. Policies for scaling, monitoring, or placement may be defined to manage the virtualized instance behavior at runtime. The various nodes, relationships, interfaces, and policies for use within a system are pre-defined as types with default properties, requirements, capabilities, and input constraints.

In some embodiments, the TOSCA standard may describe the topology, relationships, operational behavior, and/or other features in a network service descriptor ("NSD"), one or more virtual network function descriptors ("VNFDs"), and/or other components (e.g., VNF forwarding graph descriptor ("VNFFGD"), virtual link descriptor ("VLD"), physical network function descriptor ("PNFD"), etc.) in the particular format. The NSD may be a template that defines the network services and/or functions to be created. For instance, the NSD may enumerate the cloud-based services, dependencies, relationships, and/or other properties of the particular VNF. The one or more VNFDs may define the particular VNF properties including the required resources (e.g., processor, memory, network, storage, etc.), the particular VNF images or artifacts, external connectivity and/or network connectivity of the particular VNF, lifecycle management and configuration, VNF-specific parameters, metadata, and/or other elements for deploying, configuring, instantiating, and/or running the particular VNF. The artifacts may include scripts, binaries, configuration files, images, containers, virtual machines, and/or other applications or executable instructions of the particular VNF. In some embodiments, VNFDs may reference or include links to the artifacts that are supported by different virtualized environments 103. For instance, first virtualized environment 103-1 may support a first file system and a first big data processing service (e.g., Elastic MapReduce), and second virtualized environment 103-2 may support a different second file system and a second big data processing service (e.g., Databricks).

Orchestration system 100 may receive (at 104) additional constraints for deploying and/or running the particular VNF. For instance, the VNF originator may request that the particular VNF run from specific regions or locations, at a specified cost, on specific hardware, and/or with other constraints.

Orchestration system 100 may query (at 106) virtualized environments 103 for available resources that satisfy the resource requirements specified in the virtualized instance definition (e.g., the NSD and/or the VNFDs), and/or the additional constraints specified by the VNF originator. For instance, orchestration system 100 may query (at 106) each virtualized environment 103 to determine which virtualized environments have hardware resources in a desired quantity and with specific functionality available at desired locations, a specified cost, and/or desired levels of performance (e.g., latency, reliability, etc.). Additionally, or alternatively, orchestration system 100 may maintain such information (e.g., may not need to query virtualized environments 103 or some other device or system), may actively monitor such information, and/or may receive such information from some other device or system that monitors hardware resources or other information associated with virtualized environments 103. As shown in FIG. 1, orchestration system 100 may select and/or allocate (at 108) a set of resources from virtualized environment 103-3 that match or exceed the requirements and/or constraints of the particular VNF.

Orchestration system 100 may determine template formats, artifacts, calls, and/or operations that are supported by selected virtualized environment 103-3. In some embodiments, orchestration system 100 may be configured with the template formats, artifacts, calls, and/or operations supported by each virtualized environment 103. For instance, orchestration system 100 may be configured to associate the cloud-specific Amazon Web Services ("AWS") CloudFormation format to first virtualized environment 103-1, the cloud-specific Azure Resource Manager ("ARM") format and the cloud-agnostic Terraform format to second virtualized environment 103-2, and the cloud-agnostic Heat format and the cloud-agnostic Terraform format to third virtualized environment 103-3. In some other embodiments, orchestration system 100 may query selected virtualized environment 103-3 to identify the cloud-specific format or cloud-agnostic format supported by that virtualized environment 103-3.

Orchestration system 100 may dynamically generate an adaptation of the virtualized instance from the standard template definition that may be deployed to and run according to the templates, formats, artifacts, calls, and/or operations that are supported by selected virtualized environment 103-3. Specifically, orchestration system 100 may convert (at 110) from the standard template first format to a cloud-specific format that is supported by selected virtualized environment 103-3 and/or a cloud-agnostic format, and may deploy (at 112) the particular VNF to the allocated set of resources in the cloud-specific or cloud-agnostic format that virtualized environment 103-3 may parse and/or process.

In some embodiments, deploying (at 112) the particular VNF may include providing the cloud-specific or cloud-agnostic definition of the particular VNF to virtualized environment 103-3. Since the cloud-specific or cloud-agnostic definition is in a supported format of virtualized environment 103-3, orchestrators within virtualized environment 103-3 may parse the definition, may install the artifacts referenced in the cloud-specific or cloud-agnostic definition on the allocated set of resources, and may configure the artifacts, services, functions, interfaces, network connectivity, and/or other components of the particular VNF according to the cloud-specific or cloud-agnostic definition.

In some other embodiments, deploying (at 112) the particular VNF may include orchestration system 100 using artifacts, API calls, and/or other operations supported by virtualized environment 103 to construct, configure, initialize, and/or control the particular VNF as a virtual machine that runs on the allocated (at 108) set of resources. In some such embodiments, configuring the set of artifacts may include using the virtualized environment supported calls and/or operations to establish network connectivity, set operational parameters, establish interoperability with other services or applications, and/or customize the runtime operations of the particular VNF according to the declarations that were originally specified in the standard template and that were converted to the formatting supported by selected virtualized environment 103-3. Accordingly, orchestration system 100 may issue a first set of API calls from a first API of a first virtualized environment in order to deploy and construct the particular VNF with a first set of artifacts supported by the first virtualized environment on resources of the first virtualized environment, and may issue a second set of API calls from a second API of a second virtualized environment in order to deploy and construct the particular VNF with a second set of artifacts supported by the second virtualized environment on resources of the second virtualized environment.

In this manner, orchestration system 100 allows the virtualized instance originators to define their virtualized instances according to a single template (e.g., the TOSCA format), and to deploy and run their virtualized instances on any cloud platform without having to account for unique requirements and/or different formatting of each virtualized environment 103. In other words, a developer may create a single virtualized instance, and orchestration system may customize that single virtualized instance to satisfy the disparate requirements of different virtualized environments 103.

Figure 2:
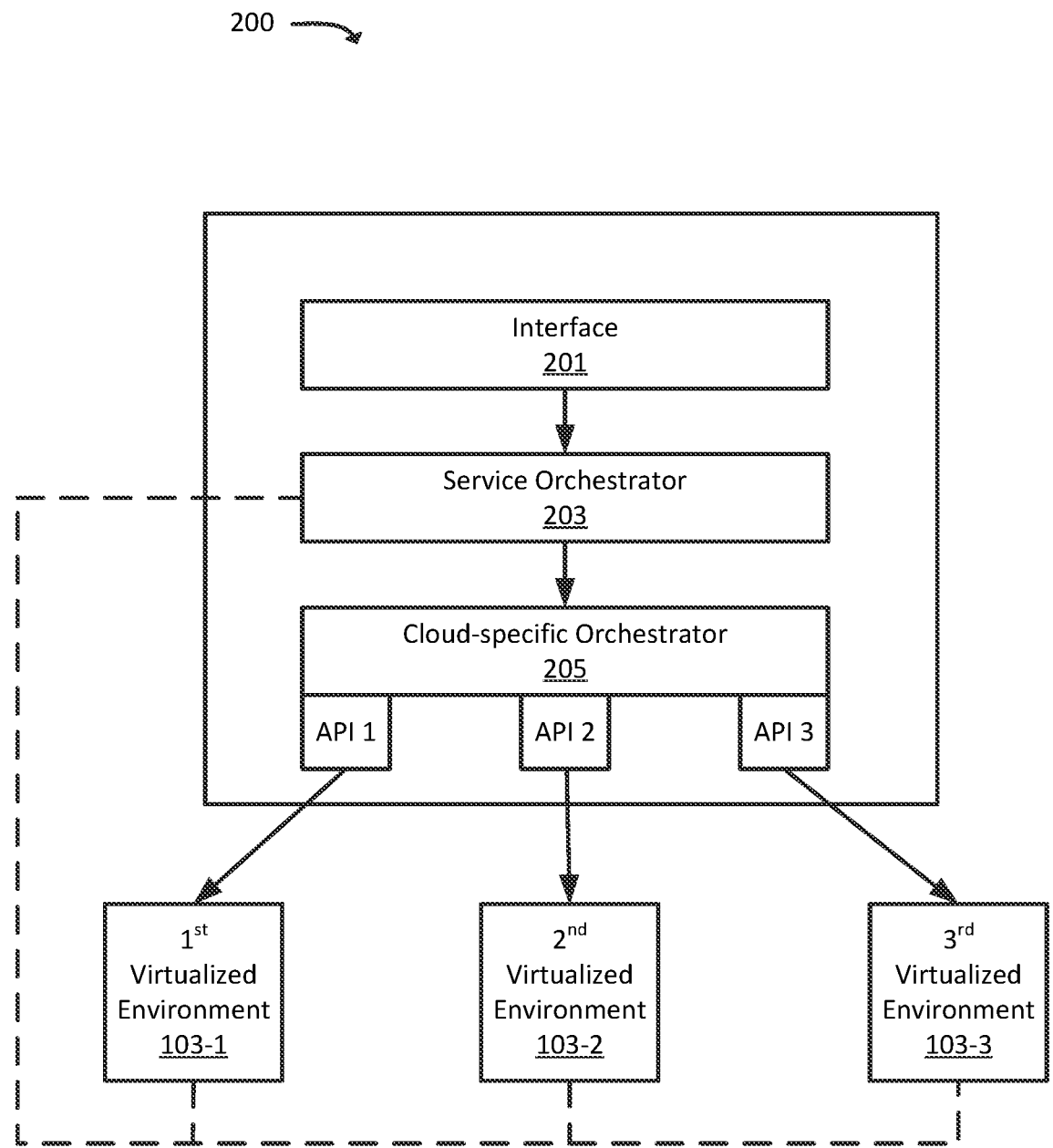
FIG. 2 illustrates an example orchestration system architecture, in accordance with some embodiments presented herein.

FIG. 2 illustrates an example orchestration system architecture 200 for dynamically converting from a standard template definition of a virtualized instance for a particular VNF, service, and/or application to a cloud-specific definition of a particular virtualized environment in accordance with some embodiments presented herein. As shown in FIG. 2, architecture 200 for orchestration system 100 may include interface 201, service orchestrator 203, and cloud-specific orchestrator 205. Architecture 200 may be used to dynamically generate different cloud-native or cloud-specific adaptations of a particular virtualized instance from the single standard template definition of the particular virtualized instance. In some embodiments, service orchestrator 203, cloud-specific orchestrator 205, and/or one or more other devices or systems of architecture 200 may implement a suitable application API or protocol, such as the open-source Kubernetes API or some other API or protocol, via which one or more VNF instances may be instantiated, provisioned, installed, configured, etc. one or more virtualized environments 103.

Interface 201 may receive and/or generate a standard template definition for a virtualized instance of a VNF, service, and/or application. In some embodiments, the virtualized instance may correspond to a software-defined network component, and may implement functionality of a router, switch, load balancer, firewall, Wide Area Network ("WAN") optimizer, a function of a core of a wireless network, and/or other network component or networking hardware. In some embodiments, the virtualized instance may define a virtual machine that implements one or more network-accessible services or applications.

In some embodiments, interface 201 may include a website, portal, an API, node, and/or other network-accessible communication pathway. User equipment ("UEs") may upload the standard template definitions for different VNF packages and/or virtualized instances to orchestration system 100 using interface 201. In some embodiments, interface 201 may provide interactive tools with which users may construct and define the standard template definitions for the VNF packages and/or virtualized instances. In some embodiments, the standard template may correspond to the TOSCA template, a template defined according to the European Telecommunications Standards Institute ("ETSI") Open Source NFV Management and Orchestration ("MANO") specification, another standardized template, and/or a custom template provided by orchestration system 100 for developers to create VNFs, services, and/or applications that may run on resources of different virtualized environments 103.

Service orchestrator 203 may inspect, parse, etc. the received standard template definition to determine resource requirements, connectivity requirements, and/or other requirements for deploying and/or running the virtualized instance that is defined therein. Additionally, service orchestrator 203 may receive additional constraints, which may be specified by a user and/or automatically generated (e.g., via one or more machine learning techniques or other suitable techniques), such as constraints relating to the deployment and/or execution of the virtualized instance. The additional constraints may include regional or positional constraints that restrict where the particular VNF may be run (e.g., North America, Asia, specific zip codes, etc.), hardware constraints that restrict the type of hardware for running the particular VNF (e.g., hardware from a specific manufacturer, hardware from a specific generation or version, etc.), performance constraints for acceptable latency, jitter, reliability, and/or other performance metrics, energy usage constraints associated with running the particular VNF on different virtualized environments, security constraints for security protocols, encryption, privacy protections, attack protections, and/or other protections required from a virtualized environment in order to run the virtualized instance on resources of that virtualized environment, and/or other requirements or restrictions that limit the set of resources that may be used to run the virtualized instance.

As similarly discussed above, service orchestrator 203 may query virtualized environments 103 and/or may otherwise select one or more virtualized environments 103 with available resources that satisfy the requirements and/or constraints specified for the deployment and/or execution of the virtualized instance. Selecting the one or more virtualized environments 103 may include reserving, allocating, provisioning, etc. a set of resources from the selected virtualized environments 103.

Service orchestrator 203 may issue one or more resource reservation messages to each selected virtualized environment 103, the selected virtualized environment 103 may allocate the set of resources to the virtualized instance in response to the resource reservation messages, and service orchestrator 203 may verify that the set of resources were successfully allocated before signaling cloud-specific orchestrator 205 to deploy and/or run the virtualized instance on the allocated set of resources. In some embodiments, allocating the set of resources may include creating a virtual machine with access to the set of resources and that will be used to host or run the virtualized instance.

In some embodiments, service orchestrator 203 may perform virtualized instance validation prior to deployment. For instance, service orchestrator 203 may verify functionality of the virtualized instance using tests that are supplied and/or described in the standard template definition of the virtualized instance. The tests may include verifying provenance and/or authenticity of the virtualized instance artifacts, and/or may include executing the virtualized instance artifacts in compatible environments and/or against various test cases to verify their operation.

Service orchestrator 203 may provide the standard template definition of the virtualized instance and one or more identifiers that identify the selected virtualized environment 103 and/or the set of resources allocated from the selected virtualized environment 103 to cloud-specific orchestrator 205. In some embodiments, the one or more identifiers may include addressing and/or credentials for accessing the allocated set of resources.

Cloud-specific orchestrator 205 may determine that the selected virtualized environment 103 requires a cloud-specific format, cloud-specific artifacts, cloud-specific API, and/or cloud-specific operations for the deployment and/or execution of virtualized instances onto resources of the selected virtualized environment 103. Accordingly, cloud-specific orchestrator 205 may generate a cloud-specific adaptation of the virtualized instance that uses and/or adheres to the cloud-specific formatting, artifacts, API, and/or operations of the selected virtualized environment 103.

In some embodiments, generating the cloud-specific adaptation may include converting and/or mapping the standard template definition to a cloud-specific definition of the selected virtualized environment 103. Accordingly, cloud-specific orchestrator 205 may modify the formatting of the NSD and the one or more VNFDs of the standard template definition to the cloud-specific formatting supported by the selected virtualized environment 103. For example, in some embodiments, cloud-specific orchestrator 205 may convert a TOSCA formatted NSD and/or VNFD to the ARM format when deploying the virtualized instance to a first virtualized environment, and may convert the TOSCA formatted NSD and/or VNFDs to the Heat format when deploying the virtualized instance to a different second virtualized environment. In some embodiments, a first cloud-specific format may require certain names, identifiers, or explicitly defined networks or subnets that are not required by a second cloud-specific format. For instance, the second cloud-specific format may rely on default values for the names, identifiers, or explicitly defined networks or subnet. Additionally, each cloud-specific format may have a different structure and/or may use different declarations than the standard template definition to define the topology, relationship, operational behavior, and/or other aspects of a virtualized instance.

Figure 3:
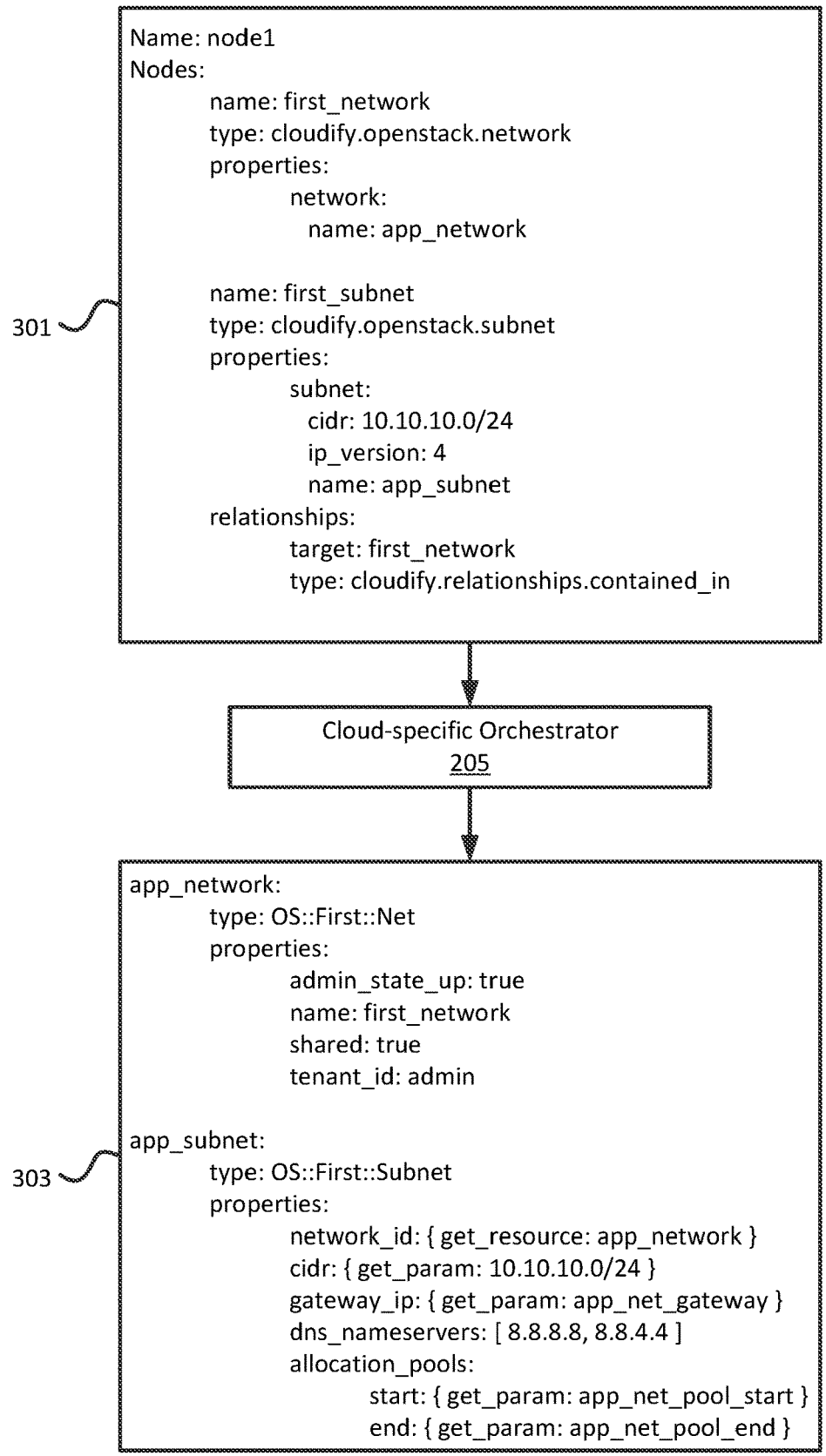
FIG. 3 illustrates an example of mapping one or more portions of a virtualized instance definition, in accordance with some embodiments presented herein.

FIG. 3 illustrates an example of cloud-specific orchestrator 205 mapping part of a virtualized instance definition from standard template format 301 to cloud-specific format 303 of a particular virtualized environment in accordance with some embodiments presented herein. As shown in FIG. 3, standard template format 301 includes a first set of declarations that define nodes, relationships, functions, services, operation, and/or other configuration of the virtualized instance, and cloud-specific format 303 includes a second set of declarations that define the same nodes, relationships, functions, services, operation, and/or other configuration of the virtualized instance using different keywords, arguments, variables, calls, operations, structure, and/or other parameters. As further shown in FIG. 3, mapping from standard template format 301 to cloud-specific format 303 may include defining new values or default values for some nodes, relationships, functions, services, operation, and/or other configuration of cloud-specific format 303 that are not present in standard template format 301, and/or removing some entries of standard template format 301 that are not required for cloud-specific format 303. For example, cloud-specific format 303 may require explicit declaration of addressing for Domain Name System ("DNS") nameservers, whereas standard template format 301 may allow for the optional declaration of the DNS nameserver addressing and may use default addressing in the absence of the optional declarations.

In some embodiments, cloud-specific orchestrator 205 may generate the cloud-specific adaptation by using cloud-specific artifacts for various functions and/or services of the virtualized instance defined in the standard template definition. In some such embodiments, the cloud-specific artifacts may be directly referenced or identified in the standard template definition. Accordingly, deploying the cloud-specific virtualized instance may involve unwrapping the correct supported set of cloud-specific artifacts from the standard template definition, and issuing commands to install that set of cloud-specific artifacts on the virtualized environment resources allocated for the virtualized instance. In some other embodiments, cloud-specific orchestrator 205 may map artifacts referenced within the standard template definition to corresponding cloud-specific artifacts that provide the same or similar functionality and/or services and that are supported by the selected virtualized environment 103. For instance, the standard template definition may specify the DynamoDB database as an artifact of the virtualized instance. Cloud-specific orchestrator 205 may be configured with a set of cloud-specific database artifacts that are supported by a selected virtualized environment 103, and may determine that the selected virtualized environment 103 does not support the DynamoDB database and that a corresponding artifact supported by the selected virtualized environment 103 is the CosmosDB database.

Cloud-specific orchestrator 205 may track different cloud-specific APIs and/or operations supported by different virtualized environments 103. Cloud-specific orchestrator 205 may use the cloud-specific API calls and/or operations that are supported by the selected virtualized environment 103 to deploy, configure, instantiate, run, and/or control operation the cloud-specific adaptation of the virtualized instance on resources of the selected virtualized environment 103. For instance, cloud-specific orchestrator 205 may issue a first set of API calls or commands to establish network connectivity for a particular virtualized instance as defined in the standard network template on resources of first virtualized environment 103-1, and may issue a second set of API calls or commands to establish the same network connectivity for the particular virtualized instance on resources of second virtualized environment 103-2. In some embodiments, each cloud-specific format for defining a node, relationship, operational behavior, function, and/or service may be associated with a different set of cloud-specific API calls and/or operations for deploying, configuring, instantiating, and/or controlling that node, relationship, operational behavior, function, and/or service on resources of a particular virtualized environment 103.

Cloud-specific orchestrator 205 may be configured with a multi-cloud adapter that stores the cloud-specific formatting, links and mappings between different cloud-specific artifacts, cloud-specific APIs, and/or other cloud-specific operations supported by each virtualized environment 103. Accordingly, cloud-specific orchestrator 205 may provide the one or more identifiers for a selected virtualized environment 103 and/or allocated set of resources to the multi-cloud adapter in order to select and/or receive the cloud-specific templates, artifacts, APIs, and/or other operations for adapting, deploying, and/or executing the virtualized instance on the set of resources allocated from the selected virtualized environment 103.

In summary, cloud-specific orchestrator 205 may convert the standard template definition for a particular virtualized instance of a VNF, service, and/or application to a first format, may use a first set of cloud-specific artifacts, may invoke calls from a first cloud-specific API, and/or may perform a first set of other cloud-specific operations in order to deploy and run that virtualized instance on resources of first virtualized environment 103-1. Similarly, cloud-specific orchestrator 205 may convert the standard template definition for the particular virtualized instance to a second format, may use a second set of cloud-specific artifacts, may invoke calls from a second cloud-specific API, and/or may perform a second set of other cloud-specific operations in order to deploy and run that virtualized instance on resources of second virtualized environment 103-2.

Figure 4:
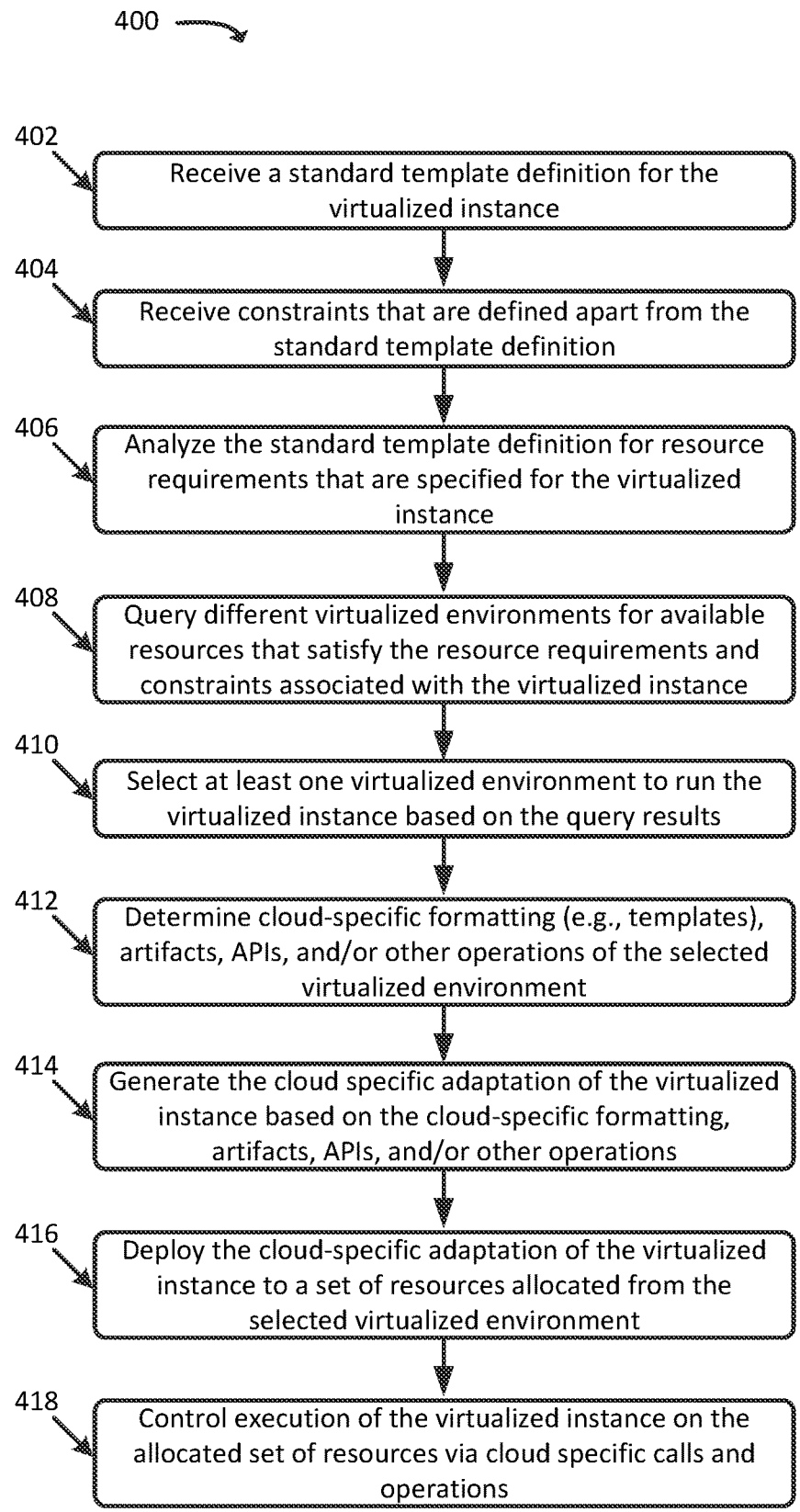
FIG. 4 presents a process for dynamically generating a cloud-specific virtualized instance, in accordance with some embodiments presented herein.

FIG. 4 presents a process 400 for dynamically generating a cloud-specific virtualized instance of a particular VNF, service, and/or application from a standard template definition of the virtualized instance in accordance with some embodiments presented herein. Process 400 may be implemented by orchestration system 100 and/or using orchestration system architecture 200.

Process 400 may include receiving (at 402) a standard template definition for the virtualized instance. The standard template definition allows a developer to define the topology, relationships, connectivity, operational behavior, and/or other aspects of the virtualized instance irrespective of different formatting, artifacts, APIs, and/or other cloud-specific requirements of different virtualized environments 103.

Process 400 may include receiving (at 404) one or more constraints that are defined apart from the standard template definition. The one or more constraints may specify various requirements or restrictions associated with deploying the virtualized instance. For instance, the one or more constraints may restrict the virtualized instance to running on hardware resources that are located within a specific region, are of a particular type, provide a minimum level of performance and/or reliability, satisfy security requirements (e.g., encryption, privacy protection, anonymization, secure networking protocols, network attack protection, etc.), and/or that are available at a certain price or cost.

Process 400 may include analyzing (at 406) the standard template definition for resource requirements of the virtualized instance. For instance, orchestration system 100 may determine the processor architecture, number of processors, amount of memory, network bandwidth, amount of storage, graphics processing units ("GPUs"), and/or other resources for running the virtualized instance from one or more of the VNFD files included within the standard template definition.

Process 400 may include querying (at 408) different virtualized environments 103 for available resources that satisfy the resource requirements specified in the standard template definition and/or the one or more constraints that are defined separate from the standard template definition. In some embodiments, service orchestrator 203 may track the resource availability of virtualized environments 103, and may perform an internal lookup to determine which virtualized environments 103 have available resources that satisfy the requirements and/or constraints specified for the virtualized instance.

Process 400 may include selecting (at 410) at least one virtualized environment 103 to run the virtualized instance based on the query results. In particular, service orchestrator 203 may determine, based on the query results, one or more virtualized environments 103 with available resources that meet or exceed the resource requirements specified within the standard template definition and that satisfy the greatest number of additional constraints specified for the virtualized instance. When several virtualized environments 103 are qualified to run the virtualized instance, service orchestrator 203 may rank the qualified virtualized environments 103 based on performance, reliability, cost, and/or other tracked metrics, and may select the highest ranked virtualized environment 103 to run the virtualized instance.

Process 400 may include determining (at 412) the formatting (e.g., templates), artifacts, APIs, and/or other operations that are specific to and supported by the selected virtualized environment 103. In some embodiments, the multi-cloud adapter for cloud-specific orchestrator 205 may be configured with the different formats, artifacts, APIs, and/or other operations that are specific to and supported by each virtualized environment 103. In some such embodiments, the multi-cloud adapter may further be configured with a mapping that converts each NSD or VNFD entry or a first set of declarations from the first format of the standard template definition to a corresponding entry or a second set of declarations in a second format that is cloud-specific and/or supported by the selected virtualized environment 103, that links an artifact referenced in the NSD or VNFD to a virtualized environment specific or supported instance of that artifact, that maps calls for deploying, configuring, instantiating, and/or controlling the virtualized instance to corresponding calls from the cloud-specific API, and/or that translates other operations associated with the virtualized instance deployment and/or execution to corresponding cloud-specific operations defined and/or supported by the selected virtualized environment 103. In other words, the second set of declarations may configure the topology, interfaces, relationships, connectivity, services, functions, operational behavior, and/or other parameters of the virtualized instance in a format that may be parsed and/or processed by orchestrator, processes, services, etc. of the selected virtualized environment 103.

Process 400 may include generating (at 414) the cloud-specific adaptation of the virtualized instance based on the cloud-specific formatting, artifacts, APIs, and/or other operations that are supported by the selected virtualized environment 103. Generating (at 414) the cloud-specific adaptation may include converting and/or translating the node topology, relationships, connectivity, operational behavior, and/or other configuration of the virtualized instance from the standard template to a cloud-specific template of the selected virtualized environment 103, and/or retrieving artifacts that are referenced in the standard template definition and that are cloud-specific or that map to cloud-specific artifacts supported by the virtualized environment 103.

Process 400 may include deploying (at 416) the cloud-specific adaptation of the virtualized instance to the set of resources that are allocated from the selected virtualized environment 103. Deploying (at 416) the virtualized instance may include issuing cloud-specific API calls to install the cloud-specific artifacts on the allocated set of resources using cloud-specific API calls and/or other cloud-specific operations. Deploying (at 416) the virtualized instance may further include configuring the virtualized instance according to the declarations from the converted cloud-specific templates, and/or according to cloud-specific API calls and other cloud-specific operations that are defined using the cloud-specific formatting of the declarations from the converted cloud-specific templates.

In some embodiments, configuring the artifacts may include providing the cloud-specific definition to the selected virtualized environment 103, and orchestrators, processes, services, etc. within the selected virtualized environment 103 may parse and process the cloud-specific definition to establish interfaces, network connectivity, relationships between the artifacts, and/or other operational behavior as defined by each declaration in the converted cloud-specific definition. In some embodiments, configuring the artifacts may include orchestration system 100 defining cloud-specific calls and/or operations to establish the interfaces, network connectivity, relationships between the artifacts, and/or other operational behavior based on the cloud-specific formatting of the declarations in the converted cloud-specific definition, and orchestration system 100 issuing the cloud-specific calls and/or operations to the orchestrators, processes, services, etc. within the selected virtualized environment 103.

Process 400 may include controlling (at 418) execution of the virtualized instance on the allocated set of resources via the cloud-specific API calls and operations. Controlling (at 418) the virtualized instance execution may include orchestration system 100 instantiating execution of the virtualized instance and dynamically adjusting the configuration and/or resource allocation as needed during runtime via the cloud-specific API calls and operations.

In some embodiments, orchestration system 100 may generate a cloud-agnostic virtualized instance that may be compatible with and/or run on resources of multiple virtualized environments 103. The cloud-agnostic adaptation may be based on templates, formats, artifacts, APIs, and/or other operations that multiple (e.g., two or more) virtualized environments 103 support directly or indirectly via a runtime emulation, translation, or conversion layer.

In some embodiments, orchestration system 100 may generate and/or deploy either a cloud-specific virtualized instance or a cloud-agnostic virtualized instance from a single definition of the virtualized instance provided in the standard template format. The cloud-specific adaptation of the virtualized instance may be preferred when performance, greater and/or specific functionality that is not available across different virtualized environments 103, and/or design agility is prioritized for the virtualized instance. For instance, a particular virtualized environment may support a specific artifact that provides a function or service that is not available and/or supported in the cloud-agnostic definition or by other content providers 103. Accordingly, in this case, orchestration system 100 may generate a cloud-specific adaptation of the virtualized instance that is constructed using the specific artifact and that performs the function or service associated with that specific artifact. The cloud-agnostic adaptation of the virtualized instance may be preferred when cross platform interoperability (e.g., multi-cloud functionality), scalability, mobility, and/or open-source compatibility is prioritized for the virtualized instance. For instance, a user may want to deploy and run a virtualized instance from a first region and a second region. No single virtualized environment may host resources in both the first region and the second region. Accordingly, orchestration system 100 may generate a cloud-agnostic adaptation of the virtualized instance that is compatible with and may run on resources of a first virtualized environment in the first region and on resources of a second virtualized environment in the second region. Orchestration system 100 may then control both deployments of the virtualized instance using the same set of cloud-agnostic calls and/or operations.

Figure 5:
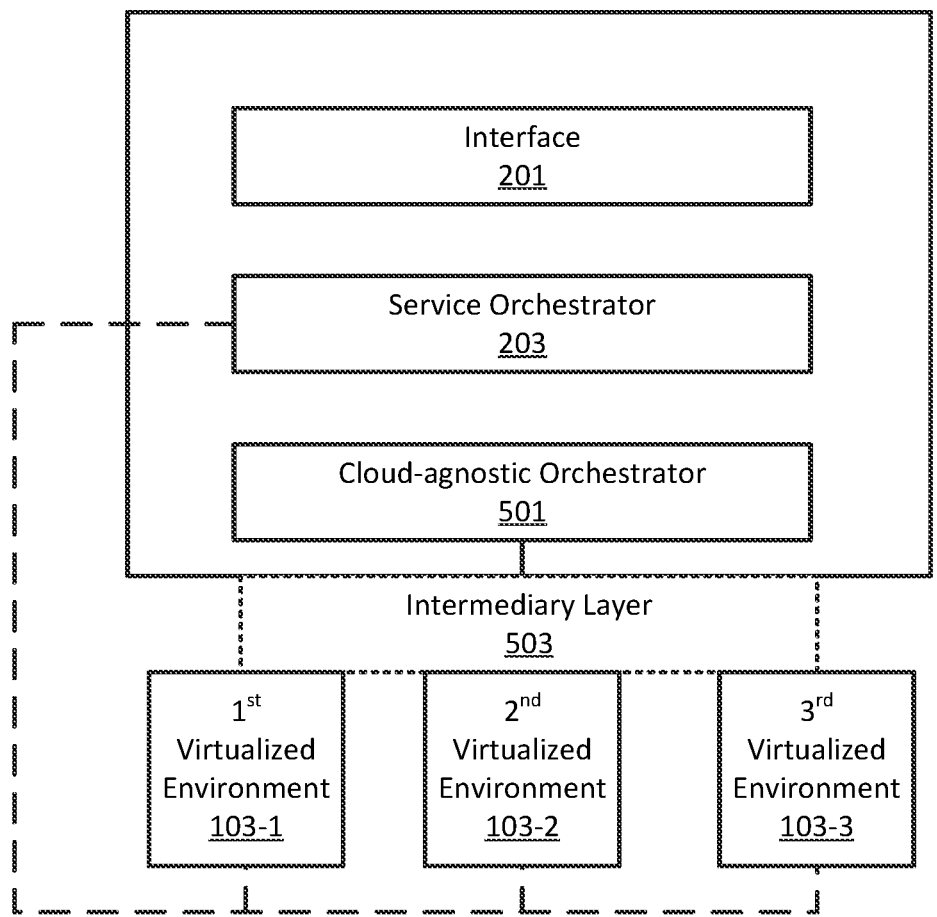
FIG. 5 illustrates an example orchestration system architecture, in accordance with some embodiments presented herein.

FIG. 5 illustrates an example orchestration system architecture 500 for dynamically converting from a standard template definition of a virtualized instance for a particular VNF, service, and/or application to a cloud-agnostic definition that is supported by multiple virtualized environments in accordance with some embodiments presented herein. As shown in FIG. 5, architecture 500 for orchestration system 100 may include interface 201, service orchestrator 203, cloud-agnostic orchestrator 501, and intermediary layer 503.

Interface 201 may receive and/or provide the tools for defining the virtualized instance in the format of the standard template. For instance, the virtualized instance may be defined in the TOSCA format.

Service orchestrator 203 may allocate a set of resources from each of two or more virtualized environments 103. Service orchestrator 203 may provide the standard template definition of the virtualized instance and identifiers for the allocated set of resources to cloud-agnostic orchestrator 501.

Cloud-agnostic orchestrator 501 may generate a cloud-agnostic adaptation of the virtualized instance that uses and/or adheres to cloud-agnostic formatting, artifacts, API, and/or operations supported by the selected virtualized environments 103. Cloud-agnostic orchestrator 501 may be configured with the cloud-agnostic templates and/or formats supported by various virtualized environments 103. For instance, virtualized environment 103-1 may define a proprietary first cloud-specific format, virtualized environment 103-2 may define a proprietary second cloud-specific format, and both virtualized environments 103-1 and 103-2 may integrate support for a common cloud-agnostic format.

In some embodiments, cloud-agnostic orchestrator 501 may generate the cloud-agnostic adaptation instead of the cloud-specific adaptation when the virtualized instance is to be deployed to run on resources of two or more virtualized environments 103. For instance, the virtualized instance may perform a distributed service, and a single virtualized environment 103 may not have sufficient resources or resources in all desired regions to run the distributed service. Accordingly, service orchestrator 203 may select multiple virtualized environments 103 to run the virtualized instance, and cloud-agnostic orchestrator 501 may generate a single cloud-agnostic adaptation that does not require customization to run on each of the different virtualized environments 103.

Generating the cloud-agnostic virtualized instance may include converting from the first format of the standard template used to define the virtualized instance to a second format of a cloud-agnostic template that virtualized environments 103 support via intermediary layer 503. In some embodiments, virtualized environments 103 integrate intermediary layer 503 such that the cloud-agnostic format is parsed and/or processed directly within each virtualized environment 103. In some embodiments, intermediary layer 503 may be used by cloud-agnostic orchestrator 501 to provide an emulation, translation, or mapping between the cloud-agnostic formatting, artifacts, APIs, and/or other operations and corresponding cloud-specific formatting, artifacts, APIs, and/or other operations. For instance, virtualized environments 103 may directly support the vRealize Automation ("vRA") cloud-agnostic templates and artifacts, and cloud-agnostic orchestrator 501 may convert the standard template definition of the virtualized instance to the vRA formatting, and may deploy the virtualized instance to each of the two or more virtualized environments 103 using vRA supported artifacts and vRA API calls. Accordingly, converting from the standard template definition to the cloud-agnostic definition may include issuing calls via a cloud-agnostic API to install cloud-agnostic artifacts on the allocated sets of resources.

In some embodiments, intermediary layer 503 may include plug-ins. The plug-ins may be used when one or more of virtualized environments 103 do not directly support the cloud-agnostic format. The plug-ins may map the cloud-agnostic API calls to cloud-specific API calls that are supported by each virtualized environment 103, and/or may swap out cloud-agnostic artifacts that are not supported by each virtualized environment 103 with corresponding cloud-specific artifacts that perform the same functionality and are supported by a selected virtualized environment.

Figure 6:
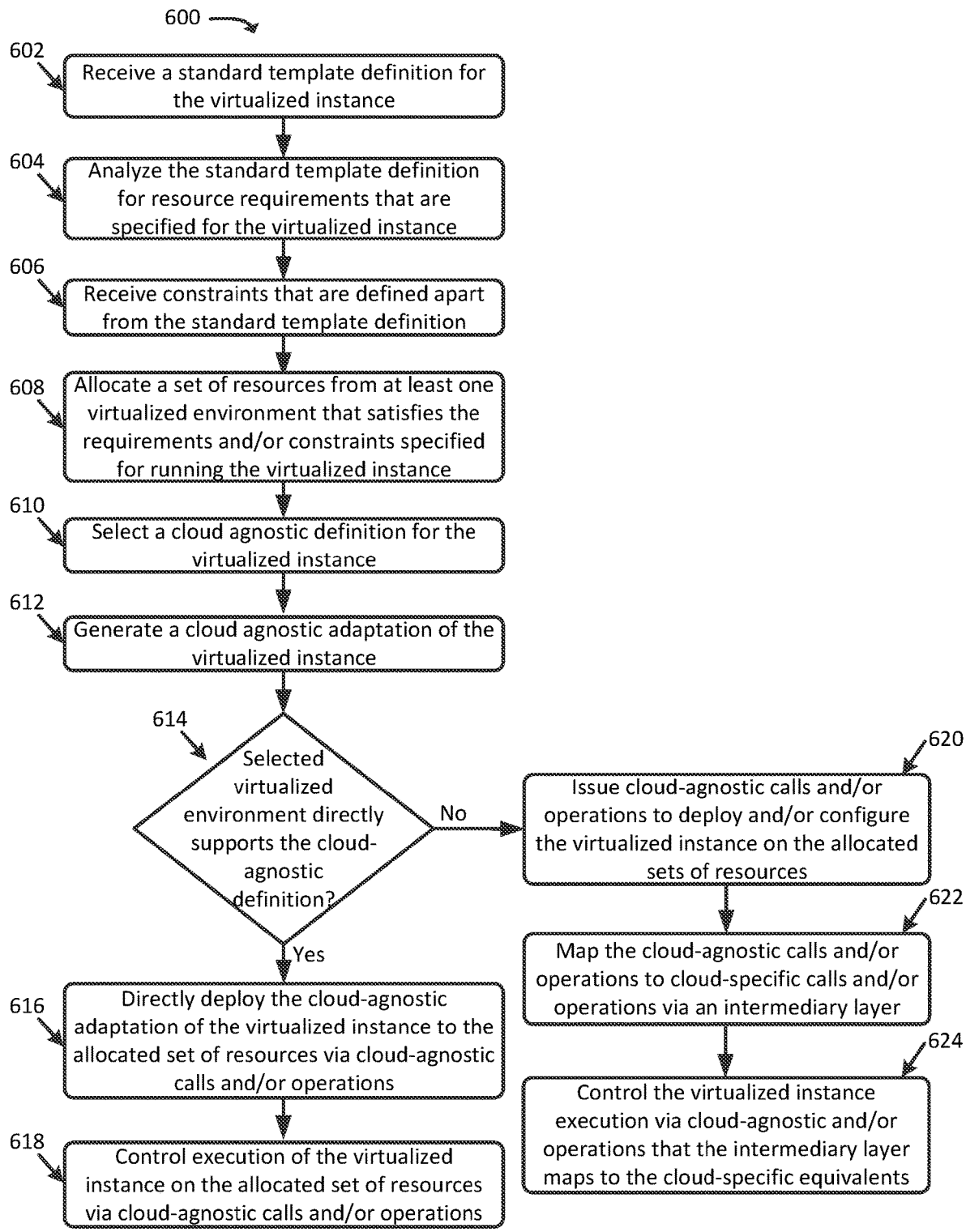
FIG. 6 presents a process for dynamically generating a cloud-agnostic virtualized instance, in accordance with some embodiments presented herein.

FIG. 6 presents a process 600 for dynamically generating a cloud-agnostic virtualized instance of a particular VNF, service, and/or application from a standard template definition of the virtualized instance in accordance with some embodiments presented herein. Process 600 may be implemented by orchestration system 100 and/or with orchestration system architecture 500.

Process 600 may include receiving (at 602) a standard template definition for the virtualized instance, and analyzing (at 604) the standard template definition for resource requirements of the virtualized instance. Process 600 may further include receiving (at 606) one or more constraints that are defined apart from the standard template definition.

Process 600 may include allocating (at 608) an available set of resources from at least one virtualized environment 103 that satisfies the requirements and/or constraints specified for running the virtualized instance. In particular, orchestration system 100 may reserve the set of resources from the at least one virtualized environment 103 for use in deploying and/or running the virtualized instance.

Process 600 may include selecting (at 610) a cloud-agnostic definition for the virtualized instance. Selection (at 610) of the cloud-agnostic definition may be dependent on the one or more selected virtualized environments 103 supporting deployment and/or execution of the virtualized instance via cloud-agnostic templates, artifacts, APIs, and/or other operations. Additionally, selection (at 610) of the cloud-agnostic definition may include determining if the virtualized instance is distributed across different virtualized environments 103, uses open source artifacts that differ from cloud-specific artifacts provided by the selected virtualized environments 103, requires resources that may not be available from any single virtualized environment 103, and/or specifies other policies related to the deployment and execution of the virtualized instance across multiple virtualized environments 103. Accordingly, orchestration system 100 may select between a cloud-agnostic definition and a cloud-specific definition for the virtualized instance based on the resource requirements and/or constraints associated with the virtualized instance.

Process 600 may include generating (at 612) a cloud-agnostic adaptation of the virtualized instance. Generating (at 612) the cloud-agnostic adaptation may include converting and/or translating from the standard template to a cloud-agnostic template, and/or retrieving cloud-agnostic artifacts that are referenced in the standard template definition. For instance, cloud-agnostic orchestrator 205 may take a TOSCA template as input, and may generate a Microservices-based Cloud Application-level Dynamic Orchestrator (MiCADO) cloud-agnostic template that may be deployed to any Open Network Automation Platform ("ONAP") supported virtualized environment 103.

Process 600 may include determining (at 614) whether the selected virtualized environment 103 integrate support for the cloud-agnostic definition. In some embodiments, two or more virtualized environments 103 may support their own respective cloud-specific definitions, and may also commonly support a particular cloud-agnostic definition such that the same cloud-agnostic definition may be directly deployed to and/or run from either of the two or more virtualized environments 103. A virtualized environment 103 may integrate support for the cloud-agnostic definition when the virtualized environment 103 is able to directly parse, process, and/or execute the cloud-agnostic templates, artifacts, API calls, and/or other cloud-agnostic operations.

In response to determining (at 614—Yes) that the one or more selected virtualized environments 103 integrate support for the cloud-agnostic definitions, process 600 may include directly deploying (at 616) the cloud-agnostic adaptation of the virtualized instance to the set of resources that are allocated from the at least one selected virtualized environment 103. Directly deploying (at 616) the cloud-agnostic adaptation may include directly issuing cloud-agnostic API calls to install the cloud-agnostic artifacts on the allocated set of resources. Directly deploying (at 616) the cloud-agnostic adaptation may further include directly issuing cloud-agnostic API calls to configure the artifacts and/or the virtualized instance as per the cloud-agnostic definition. Process 600 may further include controlling (at 618) execution of the virtualized instance on the allocated set of resources via the cloud-agnostic API calls and operations. In some embodiments, directly deploying (at 616) the cloud-agnostic adaptation may include providing the cloud-agnostic template definition to the selected virtualized environments 103 using the cloud-agnostic API calls, and the selected virtualized environments 103 may parse and process the cloud-agnostic template definition to install and configure the cloud-agnostic artifacts on the allocated resources, and to further establish interfaces, network connectivity, relationships between the artifacts, and/or other operational behavior as defined in the converted cloud-agnostic templates.

In response to determining (at 614—No) that the one or more selected virtualized environments 103 do not directly integrate support for the cloud-agnostic definitions, process 600 may include issuing (at 620) the cloud-agnostic templates, artifacts, API calls, and/or operations through intermediary layer 503, and mapping (at 622) to templates, artifacts, API calls, and/or operations that are supported by the virtualized environments 103 via intermediary layer 503. Intermediary layer 503 may include plug-ins that perform different emulation, translation, and/or conversion for different virtualized environments 103. Process 600 may further include controlling (at 624) the virtualized instance execution via cloud-agnostic API calls and/or cloud-agnostic operations that the intermediary layer maps to the cloud-specific equivalents.

Figure 7:
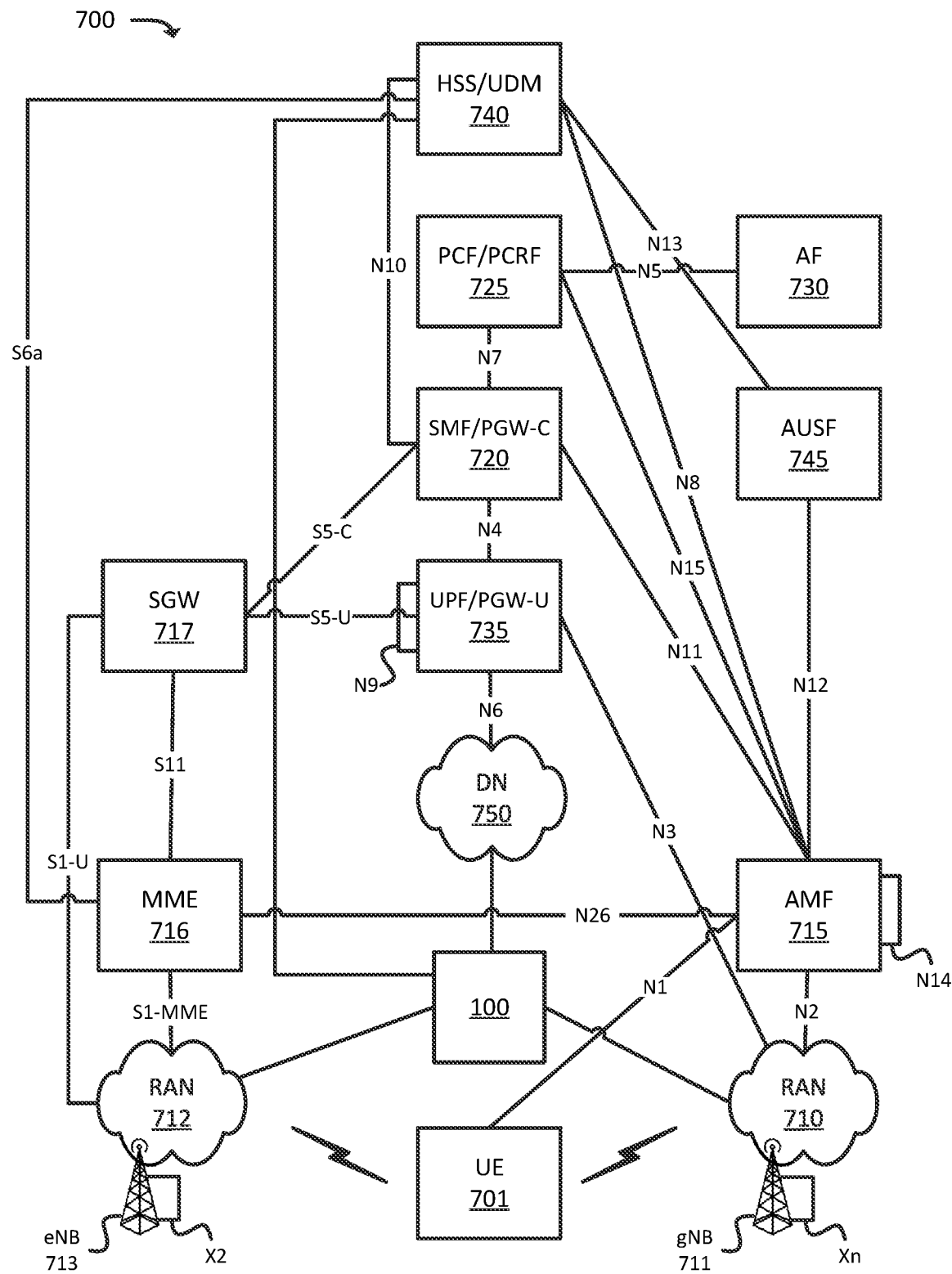
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MIME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as orchestration system 100.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735. In some embodiments, IoT device 103 may include, may be implemented by, and/or may be communicatively coupled to one or more UEs 701.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, CNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701. In some embodiments, UIR 301 may include, may be implemented by, and/or may be communicatively coupled to HSS/UDM 740.

DN 750 may include one or more wired and/or wireless networks. For example, DN 750 may include an Internet Protocol IP-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

In some embodiments, orchestration system 100 may be used to deploy and run one or more of RAN 710, RAN 712, AMF 715, MME 716, SGW 717, SMF/PGW-C 720, PCF/PCRF 725, AF 730, UPF/PGW-U 735, HSS/UDM 740, AUSF 745, and/or other network functions of environment 700 as VNFs that execute using resources of different virtualized environments 103. Virtualized environments 103 may be located in DN 750.

Figure 8:
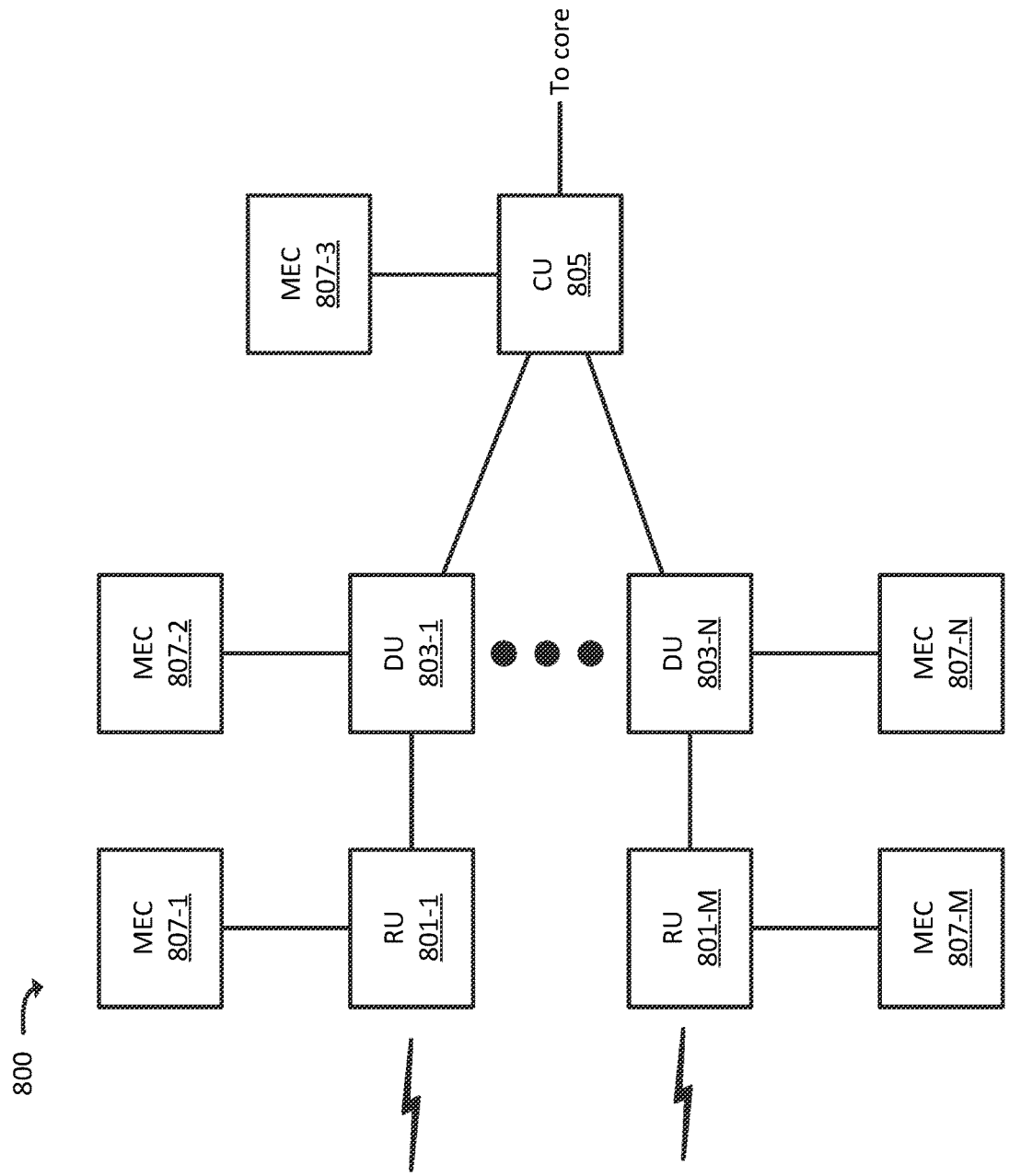
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to orchestration system 100.

Figure 9:
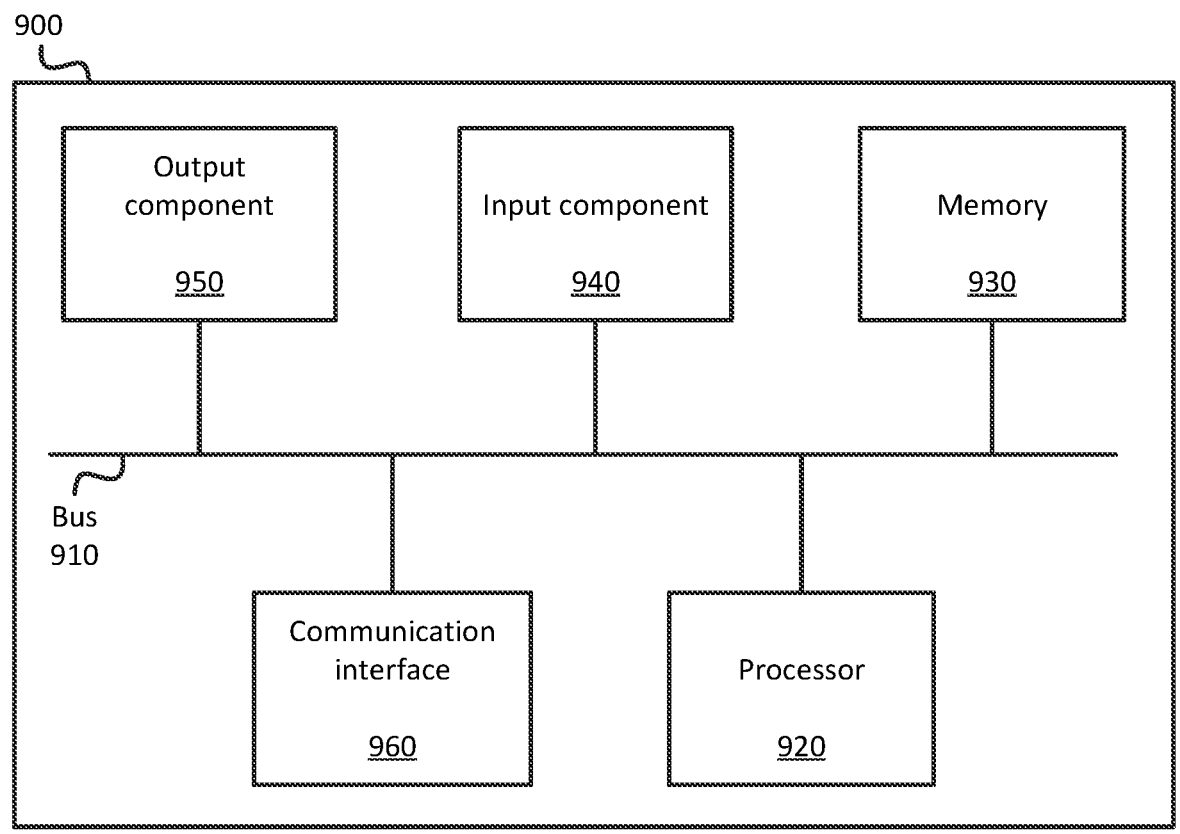
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4B), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a first definition for a virtualized instance of a network function, wherein the first definition comprises a first set of declarations that define the virtualized instance in a first format;
determine that the first format is different from respective formats supported by a plurality of virtualized environments;
automatically select a particular virtualized environment, from the plurality of virtualized environments, to run the virtualized instance based on a comparison of resource requirements specified within the first definition with one or more available resources associated with each of the plurality of virtualized environments;
identify a second format that is supported by the particular virtualized environment, wherein the second format is different from the first format, wherein the second format includes a set of required declarations;
generate a second definition for the virtualized instance with a second set of declarations that map the first set of declarations from the first format to the second format that is supported by the particular virtualized environment, wherein generating the second definition includes:
identifying particular networking information, that is not included in the first set of declarations, and that is indicated as a required declaration of the set of required declarations of the second format, and
including the particular networking information as one or more of the second set of declarations in the second definition; and
deploy the virtualized instance to execute on a set of resources of the particular virtualized environment using the second set of declarations from the second definition, wherein deploying the virtualized instance comprises:
configuring operation of the virtualized instance based on one or more of the second set of declarations matching a configuration format supported by the particular virtualized environment.

2. The device of claim 1, wherein selecting the particular virtualized environment comprises:
determining a set of resource requirements that are specified in the first definition for running the virtualized instance;
determining an amount of available resources associated with each virtualized environment, of the plurality of virtualized environments;
determining that the particular virtualized environment is associated with a particular amount of available resources that satisfy the set of resource requirements specified in the first definition; and
allocating the set of resources from the particular virtualized environment based on the determining that the available resources associated with the particular virtualized environment satisfies the set of resource requirements specified in the first definition.

3. The device of claim 1, wherein the particular virtualized environment is a first virtualized environment, wherein the one or more processors are further configured to:
select a second virtualized environment from the plurality of virtualized environments to run the virtualized instance;
determine that the second virtualized environment supports a third format that is incompatible with the first format and the second format, wherein the second format is a cloud-specific format of the first virtualized environment and the third format is a cloud-specific format of the second virtualized environment;
generate a third definition for the virtualized instance with a third set of declarations that map the first set of declarations from the first format to the third format; and
deploy the virtualized instance to execute on a set of resources of the second virtualized environment using the third set of declarations from the third definition.

4. The device of claim 1, wherein deploying the virtualized instance further comprises:
   determining an application programming interface ("API") that is defined by the particular virtualized environment;
   mapping the second set of declarations to a set of calls within the API; and
   issuing the set of calls to install one or more artifacts of the virtualized instance on the set of resources and to configure the one or more artifacts.

5. The device of claim 1, wherein the particular virtualized environment is a first virtualized environment, wherein the one or more processors are further configured to:
   select a second virtualized environment from the plurality of virtualized environments to run the virtualized instance;
   determine that the second format is supported by the first virtualized environment and the second virtualized environment; and
   deploy the virtualized instance to execute on a set of resources of the second virtualized environment using the second set of declarations from the second definition.

6. The device of claim 1, wherein deploying the virtualized instance further comprises:
   establishing network connectivity for the virtualized instance based on one or more of the second set of declarations matching a network declaration format supported by the particular virtualized environment.

7. The device of claim 1, wherein deploying the virtualized instance further comprises:
   determining that a first set of artifacts referenced in the first definition are incompatible with the particular virtualized environment;
   mapping the first set of artifacts to a different second set of artifacts that are compatible with the particular virtualized environment and that provide common functionality as the first set of artifacts; and
   installing the second set of artifacts to run using the set of resources.

8. A non-transitory computer-readable medium, storing a plurality of processor-executable instructions to:
   receive a first definition for a virtualized instance of a network function, wherein the first definition comprises a first set of declarations that define the virtualized instance in a first format;
   determine that the first format is different from respective formats supported by a plurality of virtualized environments;
   select a particular virtualized environment, from the plurality of virtualized environments, to run the virtualized instance based on a comparison of resource requirements specified within the first definition with one or more available resources associated with each of the plurality of virtualized environments;
   identify a second format that is supported by the particular virtualized environment, wherein the second format is different from the first format, wherein the second format includes a set of required declarations;
   generate a second definition for the virtualized instance with a second set of declarations that map the first set of declarations from the first format to the second format that is supported by the particular virtualized environment, wherein generating the second definition includes:
      identifying particular networking information, that is not included in the first set of declarations, and that is indicated as a required declaration of the set of required declarations of the second format, and
      including the particular networking information as one or more of the second set of declarations in the second definition; and
   deploy the virtualized instance to execute on a set of resources of the particular virtualized environment using the second set of declarations from the second definition, wherein deploying the virtualized instance comprises:
      configuring operation of the virtualized instance based on one or more of the second set of declarations matching a configuration format supported by the particular virtualized environment.

9. The non-transitory computer-readable medium of claim 8, wherein selecting the first virtualized environment comprises:
   determining a set of resource requirements that are specified in the first definition for running the virtualized instance;
   determining an amount of available resources associated with each virtualized environment, of the plurality of virtualized environments;
   determining that the particular virtualized environment is associated with a particular amount of available resources that satisfy the set of resource requirements specified in the first definition; and
   allocating the set of resources from the particular virtualized environment based on the determining that the available resources associated with the particular virtualized environment satisfies the set of resource requirements specified in the first definition.

10. The non-transitory computer-readable medium of claim 8, wherein the particular virtualized environment is a first virtualized environment, wherein the plurality of processor-executable instructions further include processor-executable instructions to:
   select a second virtualized environment from the plurality of virtualized environments to run the virtualized instance;
   determine that the second virtualized environment supports a third format that is incompatible with the first format and the second format, wherein the second format is a cloud-specific format of the first virtualized environment and the third format is a cloud-specific format of the second virtualized environment;
   generate a third definition for the virtualized instance with a third set of declarations that map the first set of declarations from the first format to the third format; and
   deploy the virtualized instance to execute on a set of resources of the second virtualized environment using the third set of declarations from the third definition.

11. The non-transitory computer-readable medium of claim 8, wherein deploying the virtualized instance further comprises:
   determining an application programming interface ("API") that is defined by the particular virtualized environment;
   mapping the second set of declarations to a set of calls within the API; and
   issuing the set of calls to install one or more artifacts of the virtualized instance on the set of resources and to configure the one or more artifacts.

12. The non-transitory computer-readable medium of claim 8, wherein the particular virtualized environment is a first virtualized environment, wherein the plurality of processor-executable instructions further include processor-executable instructions to:
- select a second virtualized environment from the plurality of virtualized environments to run the virtualized instance;
- determine that the second format is supported by the first virtualized environment and the second virtualized environment; and
- deploy the virtualized instance to execute on a set of resources of the second virtualized environment using the second set of declarations from the second definition.

13. The non-transitory computer-readable medium of claim 8, wherein deploying the virtualized instance further comprises:
- establishing network connectivity for the virtualized instance based on one or more of the second set of declarations matching a network declaration format supported by the particular virtualized environment.

14. The non-transitory computer-readable medium of claim 8, deploying the virtualized instance further comprises:
- determining that a first set of artifacts referenced in the first definition are incompatible with the particular virtualized environment;
- mapping the first set of artifacts to a different second set of artifacts that are compatible with the particular virtualized environment and that provide common functionality as the first set of artifacts; and
- installing the second set of artifacts to run using the set of resources.

15. A method, comprising:
- receiving a first definition for a virtualized instance of a network function, wherein the first definition comprises a first set of declarations that define the virtualized instance in a first format;
- determining that the first format is different from respective formats supported by a plurality of virtualized environments;
- selecting a particular virtualized environment, from the plurality of virtualized environments, to run the virtualized instance based on a comparison of resource requirements specified within the first definition with one or more available resources associated with each of the plurality of virtualized environments;
- identifying a second format that is supported by the particular virtualized environment, wherein the second format is different from the first format, wherein the second format includes a set of required declarations;
- generating a second definition for the virtualized instance with a second set of declarations that map the first set of declarations from the first format to the second format that is supported by the particular virtualized environment, wherein generating the second definition includes:
  - identifying particular networking information, that is not included in the first set of declarations, and that is indicated as a required declaration of the set of required declarations of the second format, and
  - including the particular networking information as one or more of the second set of declarations in the second definition; and
- deploying the virtualized instance to execute on a set of resources of the particular virtualized environment using the second set of declarations from the second definition, wherein deploying the virtualized instance comprises:
  - configuring operation of the virtualized instance based on one or more of the second set of declarations matching a configuration format supported by the particular virtualized environment.

16. The method of claim 15, wherein selecting the first virtualized environment comprises:
- determining a set of resource requirements that are specified in the first definition for running the virtualized instance;
- determining an amount of available resources associated with each virtualized environment, of the plurality of virtualized environments;
- determining that the particular virtualized environment is associated with a particular amount of available resources that satisfy the set of resource requirements specified in the first definition; and
- allocating the set of resources from the particular virtualized environment based on the determining that the available resources associated with the particular virtualized environment satisfies the set of resource requirements specified in the first definition.

17. The method of claim 15, wherein the particular virtualized environment is a first virtualized environment, the method further comprising:
- selecting a second virtualized environment from the plurality of virtualized environments to run the virtualized instance;
- determining that the second virtualized environment supports a third format that is incompatible with the first format and the second format, wherein the second format is a cloud-specific format of the first virtualized environment and the third format is a cloud-specific format of the second virtualized environment;
- generating a third definition for the virtualized instance with a third set of declarations that map the first set of declarations from the first format to the third format; and
- deploying the virtualized instance to execute on a set of resources of the second virtualized environment using the third set of declarations from the third definition.

18. The method of claim 15, wherein deploying the virtualized instance further comprises:
- determining an application programming interface ("API") that is defined by the particular virtualized environment;
- mapping the second set of declarations to a set of calls within the API; and
- issuing the set of calls to install one or more artifacts of the virtualized instance on the set of resources and to configure the one or more artifacts.

19. The method of claim 15, wherein the particular virtualized environment is a first virtualized environment, the method further comprising:
- selecting a second virtualized environment from the plurality of virtualized environments to run the virtualized instance;
- determining that the second format is supported by the first virtualized environment and the second virtualized environment; and
- deploying the virtualized instance to execute on a set of resources of the second virtualized environment using the second set of declarations from the second definition.

20. The method of claim 15, wherein deploying the virtualized instance further comprises:
    establishing network connectivity for the virtualized instance based on one or more of the second set of declarations matching a network declaration format supported by the particular virtualized environment.

* * * * *